US005764276A

United States Patent [19]
Martin et al.

[11] Patent Number: 5,764,276
[45] Date of Patent: Jun. 9, 1998

[54] METHOD AND APPARATUS FOR PROVIDING PERCEIVED VIDEO VIEWING EXPERIENCES USING STILL IMAGES

[75] Inventors: H. Lee Martin, Knoxville; H. Craig Grantham, Jefferson City, both of Tenn.

[73] Assignee: Interactive Pictures Corporation, Oak Ridge, Tenn.

[21] Appl. No.: 742,684

[22] Filed: Oct. 31, 1996

Related U.S. Application Data

[63] Continuation-in-part of Ser. No. 516,629, Aug. 18, 1995, which is a continuation-in-part of Ser. No. 494,599, Jun. 23, 1995, abandoned, which is a continuation-in-part of Ser. No. 386,912, Feb. 8, 1995, abandoned, which is a continuation of Ser. No. 339,663, Nov. 14, 1994, abandoned, which is a continuation of Ser. No. 189,585, Jan. 31, 1994, Pat. No. 5,384,558, which is a continuation-in-part of Ser. No. 699,366, May 13, 1991, Pat. No. 5,185,667, said Ser. No. 742,684, Oct. 31, 1996, is a continuation-in-part of Ser. No. 373,446, Jan. 7, 1995, which is a continuation-in-part of Ser. No. 189,585, Jan. 31, 1994, Pat. No. 5,384,388.

[51] Int. Cl.$^6$ ............................ H04N 7/15; H04N 5/30
[52] U.S. Cl. ............................ 348/13; 348/15; 348/17; 348/18; 348/222; 348/552; 382/232
[58] Field of Search .................... 348/13, 15, 19, 348/36, 17, 18, 384, 207, 144, 578, 552, 22; 382/232, 254; H04N 7/15, 5/30

[56] References Cited

U.S. PATENT DOCUMENTS

| | | | |
|---|---|---|---|
| 4,549,208 | 10/1985 | Kamejima et al. | 358/108 |
| 4,807,158 | 2/1989 | Branton et al. | 364/521 |
| 5,185,667 | 2/1993 | Zimmermann | 348/207 |
| 5,200,818 | 4/1993 | Neta et al. | 358/87 |
| 5,432,871 | 7/1995 | Novik | 382/232 |
| 5,444,476 | 8/1995 | Conway | 348/15 |
| 5,479,203 | 12/1995 | Kawai et al. | 348/15 |
| 5,550,646 | 8/1996 | Hassan et al. | 358/442 |
| 5,606,365 | 2/1997 | Maurinus et al. | 348/552 |
| 5,682,511 | 10/1997 | Sposato et al. | 395/353 |

FOREIGN PATENT DOCUMENTS

| | | |
|---|---|---|
| 2-127877 | 5/1990 | Japan. |
| WO 96/26611 | 8/1996 | WIPO. |

OTHER PUBLICATIONS

Nasa's Tiny Camera Has a Wide–Angle Future, Science & Technology. Business Week, pp. 54–55, Mar. 6, 1995.

G. David Ripley, "DVI–A Digital Multimedia technoolofy", Communications of the ACM Jul. 1989 vol. 32, No. 7, pp. 811–822.

M. Onoe et al., "Digital Processing of Images Taken by Fish–Eye Lens". IEEE: Proceedings, New York, 1982, vol. 1, pp. 105–108.

N. Greene, "Environment Mapping and Other Applications of World Projections", IEEE Computer Graphics and Applications, Nov. 1986, pp. 21–29.

N. Greene, "A Method of Modeling Sky for Computer Animations", Proc. First Int'l. Conf. Enigineering and Computer Graphics, Aug. 1984, pp. 297–300.

J. Blinn et al., "Texture and Reflection in Computer Generated Images," Comm. ACM, vol. 19, No. 10, 1976, pp. 542–547.

(List continued on next page.)

*Primary Examiner*—Glenton B. Burgess

[57] ABSTRACT

A method and apparatus for sequencing views retrieved from a spherical still image file provide the viewer the perception of video performance with low bandwidth transmission. The method incorporates digital transmission and automatic sequencing of the playback of the view. The apparatus provides video-motion rate images via low bandwidth digital transmissions or small data files from a still image taken of an inanimate environment. The resulting method and apparatus allows the viewer to experience a video display of any environment (for example, real estate locations, malls, museums, and hotels) and view a "video" tour of the location through a low bandwidth transmission.

7 Claims, 4 Drawing Sheets

OTHER PUBLICATIONS

F. Kenton Musgrave, "A Panoramic Virtual Screen for Ray Tracing", Graphics Gems, 1992, pp. 288–294.

J.D. Foley et al., "Computer Graphics: Principles and Practice", 1990, 1996, pp. 229–381.

Intel Corporation, "Action Media 750 Production Tool Reference", 1988, 1991.

S. Morris, "Digital Video Interactive—A New Integrated Format for Multi-Media Information", Microcomputer for Information Management, Dec. 1987, 4(4):249–261.

"Declaration of Scott Gilbert in Support of Defendant Infinite Pictures" Memorandum in Opposition to Plaintiff's Motion for Preliminary Injunction, Omniview, Inc. v. Infinite Pictures, Inc., Civ. Action No. 3–96–849.

A. Paeth, "Digital Cartography for Computer Graphics", Graphics Gems, 1990, pp. 307–320.

N. Greene et al., "Creating Raster Omnimax Images from Multiple Perxpective Views Using the Elliptical Weighted Average Filter", IEEE Computer Graphics and Applications, Jun. 1986, pp. 21–27.

S. Ray, "The Lens in Action", Hastings House, 1976, pp. 114–117.

F. Pearson II, "Map Projections Theory and Applications", CRC Press, Inc., 1990, pp. 215–345.

G. Wolberg, "Digital Image Warping", IEEE Computer Society Press, 1988.

| 3A | START | LOBBY.BUB | PAN:0 | TILT:10 | ZOOM:1.1 | TIME:3 |
| --- | --- | --- | --- | --- | --- | --- |
| 3B | LAUNCH | WELCOME.WAV | | | | TIME:0 |
| 3C | MOVE | | PAN:70 | TILT:10 | ZOOM:1.1 | TIME:2 |
| 3D | ZOOM | | PAN:70 | TILT:10 | ZOOM:2.2 | TIME:4 |
| 3E | LAUNCH | ROOM.BUB | PAN:5 | TILT:20 | ZOOM:1.0 | TIME:1 |

METHOD AND APPARATUS FOR PROVIDING PERCEIVED VIDEO VIEWING EXPERIENCES USING STILL IMAGES

RELATED APPLICATIONS

This application is a continuation-in-part of U.S. application Ser. No. 08/516,629, filed Aug. 18, 1995, entitled "Method and Apparatus for the Interactive Display of Any Portion of a Spherical Image", still pending of Laban Phelps Jackson, Alexis S. Pecoraro, Peter Hansen, Martin L. Bauer, and H. Lee Martin, which is a continuation-in-part of Ser. No. 08/494,599, filed Jun. 23, 1995, now abandon, entitled "Method and Apparatus for Simultaneous Capture of a Spherical Image" of Danny A. McCall and H. Lee Martin, which is a continuation-in-part of a U.S. application Ser. No. 08/386,912 filed Feb. 8, 1995, now abandon, which is a continuation of U.S. application Ser. No. 08/339,663 filed Nov. 11, 1994, now abandon, which is a continuation of U.S. application Ser. No. 08/189,585 filed Jan. 31, 1994(now U.S. Pat. No. 5,384,588), which is a continuation-in-part of U.S. application Ser. No. 07/699,366 filed May 13, 1991 (now U.S. Pat. No. 5,185,667). This application is also a continuation-in-part of U.S. application Ser. No. 08/373,446 filed Jan. 17, 1995, pending, which is a continuation-in-part of U.S. application Ser. No. 08/189,585 filed Jan. 31, 1994 (now U.S. Pat. No. 5,384,588).

Other parent applications, which may be of reference for various parts of the invention described in greater detail below, include the following: U.S. application Ser. No. 08/516,629, filed Aug. 15, 1995, entitled "Method and Apparatus for the Interactive Display of Any Portion of a Spherical Image" of Laban Phelps Jackson, Alexis S. Pecoraro, Peter Hansen, Martin L. Bauer, and H. Lee Martin, which is a continuation-in-part of Ser. No. 08/494,599, filed Jun. 23, 1995, entitled "Method and Apparatus for Simultaneous Capture of a Spherical Image" of Danny A. McCall and H. Lee Martin, which is a continuation-in-part of a U.S. application Ser. No. 08/386,512 filed Feb. 8, 1995, which is a continuation of U.S. application Ser. No. 08/339,663 filed Nov. 11, 1994, which is a continuation of U.S. application Ser. No. 08/189,585 filed Jan. 31, 1994 (now U.S. Pat. No. 5,384,588), which is a continuation-in-part of U.S. application Ser. No. 07/699,366 filed May 13, 1991 (now U.S. Pat. No. 5,185,667). This application is also a continuation-in-part of U.S. application Ser. No. 08/373,446 filed Jan. 17, 1995, which is a continuation-in-part of U.S. application Ser. No. 08/189,585 filed Jan. 31, 1994 (now U.S. Pat. No. 5,384,588).

BACKGROUND OF THE INVENTION

1. Technical Field

The invention relates to an apparatus and method for utilizing still spherical or high resolution flat images to provide a moving tour through the image that creates the perception of the part of the user of experiencing a video presentation. The invention allows a multiplicity of predetermined paths to be followed faithfully in such a way as to be replicable. In this invention, the objective is the control of the view shown to the user instead of manipulation of an object, the data is the angle of view, and hardware is a computer monitor. The invention solves a key problem with the transmission of sequenced images (i.e. video) over small bandwidth connections by using a sequence of move commands on the still spherical or high-resolution flat image to imitate a video of the environment or object. Additionally, the subject invention allows the user to take control of the viewing direction at any time and look in any desired direction, giving a new dimension to interactive television, namely, personalized control of what is viewed.

2. Related Art

It is known how to pan, tilt, rotate, and magnify a live video image via an affine transformation algorithm as documented patented in U.S. Pat. No. 5,185,667, assigned to the same assignee as this disclosure. This method captures a live video or still photographic image, removes the distortion associated with the lens optics, and reconstructs a portion of the image that is of interest based on operator requests for pan, tilt, rotation, and magnification. One application of the dewarping technique disclosed by this patent is the dewarping of hemispherical images. The capturing and dewarping of hemispherical images is disclosed in greater detail in U.S. Pat. No. 5,185,667, expressly incorporated herein by reference. The ability to simultaneously distribute these images and allow multiple users to independently view the image in any desired direction is documented and patented in U.S. Pat. No. 5,384,588, assigned to the same assignee as this disclosure and, hereby, incorporated by reference.

Video images, as described in each of the above-referenced patents, require approximately 30 frames per second to appear as a real-time video image. Unfortunately, a problem with real-time video rates is the great amount of memory and processing speed required to display these images. Alternatively, if a user wanted to download a real-time video clip from a distant source via a modem (for example, a bulletin board system or a global network of computers), the user must have a high speed modem with a wide bandwidth (for example, a minimum 128 kps ISDN line or a T1 or a T3) with a relatively powerful computer to download these images and display them in real-time. As most users do not have high speed modems or relatively power computers, not to mention, a bandwidth capable of handling real-time videos, most users are at a disadvantage. Even compressing the video data fails to achieve good results.

Other techniques of transmitting images include transmitting a single still image after single still image. This saves bandwidth but is no more exciting than watching a slide presentation with someone else operating the slide projector. This is because the viewer is presented with a bland, static, two-dimensional image.

In a different field of endeavor, a technique is known in the robotics industry which is know as "teach/playback". The "teaching" mode of a "teach/playback" technique relates to the recording of a series of movements of a user controlled device. Later, in the "playback" mode, the recorded movements are played back for subsequent purposes. An instance of the "teach/playback" technique is in the automotive industry where a robot operator "teaches" a robotic system how to perform a complex series of tasks involving various manipulations. For example, the robotic system may be taught how to weld portions of a car's body panels to a car's frame. In the playback mode, the robotic system repeatedly follows its memorized commands and welds body panels to frames as per its instructions. The "teach/playback" technique of programming manipulative systems has its drawbacks. For instance, systems operating under a "teach/playback" technique are inherently limited to perform only the recorded instructions. Variation in the playback of a recorded set of instructions is unheard of. The only way to change the operations of the control device is to reprogram its instruction set, or here, "reteach" the system.

OBJECTS OF THE INVENTION

Accordingly, it is an object of the present invention to provide a user experience that appears to be video, but uses spherical still images with sequencing instructions as its command file.

It is another object of the present invention to provide this imaging experience using digital files that can be bundled with other files to present a multimedia experience.

It is a further object of the present invention to provide a continuation viewing experience by decompressing the next image to be viewed (and audio files to be heard) while displaying a current image and playing a current audio file.

It is another object of the invention to allow the user to interrupt the "video" sequence at any time and take control of the viewing direction and magnification.

It is a further object of the invention to allow the data required for this viewing experience to reside in a remote location and be downloaded to one or many users simultaneously (or sequentially, or as requested) via telecommunication networks including at least local area networks, wide area networks, global area networks, satellite networks and other related networks by means of satellite downloading, modem downloading, broadcast downloading or other equivalent downloading means.

It is another object of the invention to provide the ability to magnify, pan, tilt, zoom, and rotate the image via a simple user interface.

It is a further object of the invention to provide the ability of panning, tilting, zooming, and rotating with simple inputs made by an unskilled user through standard input means including joysticks, keyboard, mice, touchpads, or equivalent means.

It is another object of the present invention to simultaneously display the multimedia experience for a plurality of users through common downloaded or broadcast information, allowing all to be sequenced at the same time or to be user controlled in different directions in any of an infinite number of directions as selected by the users.

These and other objects of the present invention will become apparent upon consideration of the drawings and accompanying description.

SUMMARY OF THE INVENTION

The invention relates to constructing a viewable image, only a portion of which is displayed at a given time in an enveloping viewing environment. Upon execution of a predetermined instruction set, a viewer is presented with a moving tour of a hemispherical/spherical image. At any time, the viewer may take control of the tour of the displayed image and explore the image on his own. By using a high resolution static image, the display of a high quality video image at real-time video rates (30 frames per second) is achieved. The result is obtained with only a fraction of the data needed to accomplish the same result as compared to compressed video data. Where a video sequence for 10 seconds of operation would require 300 separate images, the subject invention requires only one image with a limited number of sequencing commands to drive the presentation.

The omnidirectional viewing system produces the equivalent of pan, tilt, and zoom within a spherical digitized photograph or sequence of digital images (digital video), or subset thereof, with no moving parts. This invention can also pan, tilt and magnify portions of a high resolution image, only revealing those portions of the image presently of interest to the user.

The small data capacity required for this form of presentation results from the fundamental data source comprising a still image that is time sequenced through its motion by simple ASCII text commands that are automatically interpreted in the running program. In one preferred embodiment, the ASCII command file is generated by the recording of an operator's viewing of a displayed image. In an alternate embodiment, the operator directly feeds commands into an text file which later controls the viewing of the still image.

The disclosed system includes a means for receiving a digital file that is composed of two hemispherical fisheye images or a single high resolution digitized image, receiving a second command file consisting of the sequence of viewing directions used to animate the still image to provide the perception of video, transforming a portion of said image based upon command file operations or user commands, and producing a continuous sequence of output images that are in correct perspective for viewing. The collection of commands used to control what a view initially sees are stored in a command sequencing data file. A user can exit from the displays control by the commands stored in the command sequencing data file and, when finished, return control to the command sequencing data file.

The resulting display provides a perception of a video image sequence even though the source data may only be composed of a digitized still photograph. In one preferred embodiment, the transmitted image is produced by a combination of two fisheye photographic images which provides a spherical data set from which to extract the sequenced field-of-view. This image data is augmented with a command file that determines the sequence of images to be displayed from the image file in such a way as to provide the appearance of a video image to the output display. These incoming data files, image and command, are captured into an electronic memory buffer and the image file is transformed to the display as directed by the command file or by the user if the command file is interrupted. The image transformation is performed computationally by a microprocessor common in many personal computer systems. Additionally, related computational devices may be used including co-processors, dedicated computers, ASICs, and equivalents thereof. The display of the sequenced image is accomplished in a window on a common computer monitor. Additionally, the display systems may include LCD's, CRT's, overhead projection devices, projection screen displays and equivlaents thereof. The experience provided by the method and apparatus can be augmented with the inclusion of audio to allow the resulting output on a "multimedia" personal computer to be similar to that of standard television.

A portion of the captured image containing a region-of-interest is transformed into a perspective correct image by image processing computer means and sequenced by the command file or by direct intervention of the user. The image processing computer provides direct mapping of the image region-of-interest into a corrected image using an orthogonal set of transformation algorithms. The viewing orientation is designated by a command signal generated by either a human operator or computer sequenced input.

DETAILED DESCRIPTION

Figure 1:
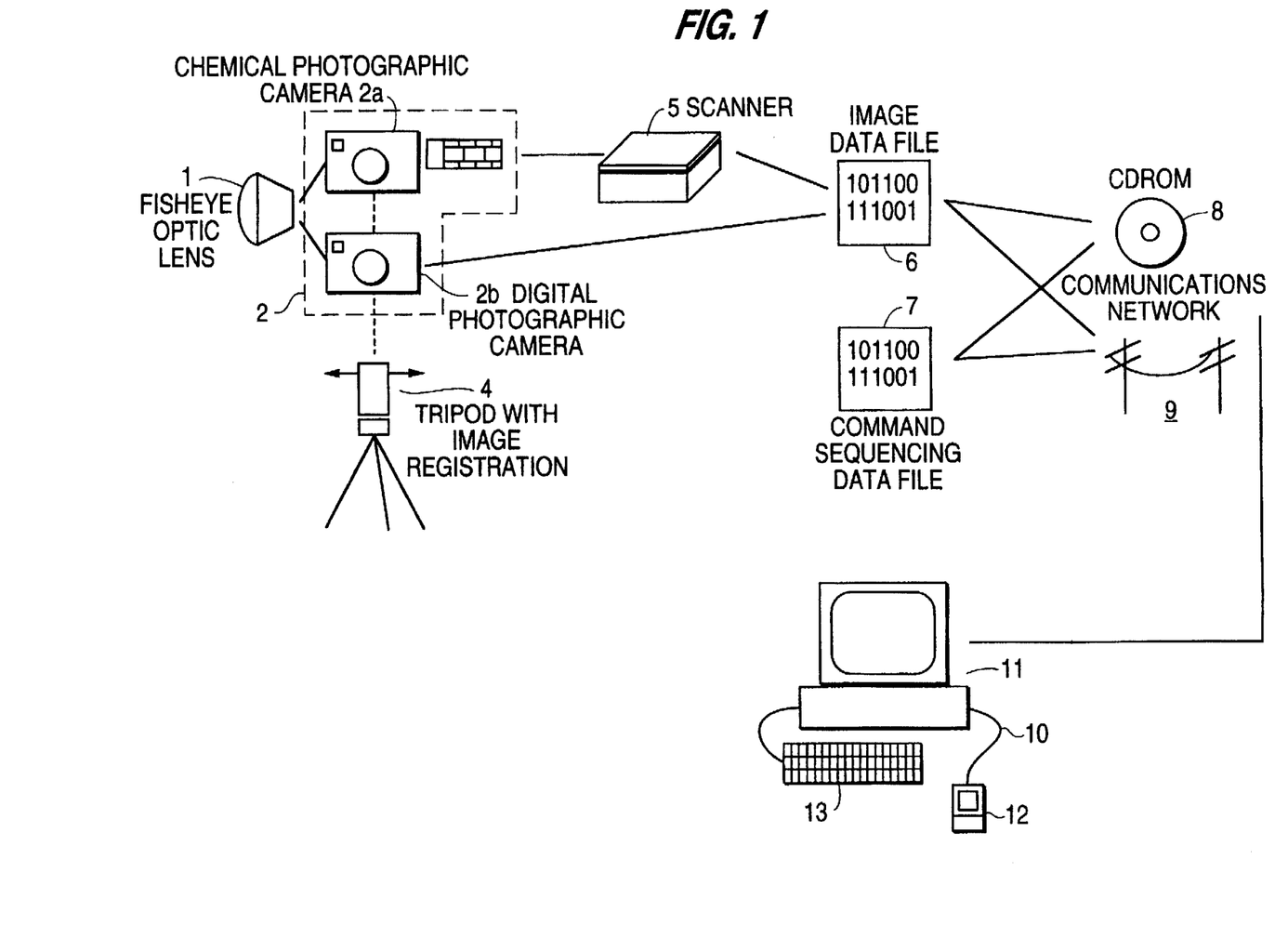
FIG. 1 shows a schematic block diagram of the present invention illustrating the major components thereof.

The principles of the present invention can be understood by reference to FIG. 1. Fisheye or wide angle lens 1 captures a hemispherical or wide angle image. Lens 1 focuses the captured image onto camera 2. Camera 2 is more fully disclosed in co-pending U.S. Ser. No. 08/494,599, entitled "Method and Apparatus for Simultaneous Capture of a Spherical Image", expressly incorporated herein by reference. The types of cameras employed are chosen from the group comprising of at least still cameras with loaded film or digital image capture, motion picture cameras with loaded film or digital image capture, the KODAK™ digital image capture system, video, linear scanning CID, CCD, or CMOS APS camera arrays and other equivalent image capture devices. The two general types of available cameras are shown by camera 2a and camera 2b. Camera 2a is a chemical camera into which film is loaded, exposed, and later developed. Camera 2b is a digital image capture camera more fully discussed in U.S. Ser. No. 08/494,599, filed Jun. 23, 1995, referenced above. Tripod 4 supports the camera 2, providing a stable image capture platform. When two back-to-back cameras are used (as disclosed in greater detail in U.S. Ser. No. 08/494,599, referenced above), tripod 4 holds the two cameras in a back-to-back relationship. The pair of cameras capture the environment in two matching hemispheres. The resulting exposed film is then processed and digitized via scanning 5 into a digital data file 6 of the entire environment.

Preferably, the resolution of an image file is at least 2000 pixels by 2000 pixels. While resolutions of 512×512 have been developed for slower computers and transmission mediums, large image sizes are preferred. A standard compressed image file of 128 kb may be decompressed in memory to 2 megs decompressed. However, while larger file sizes are preferred as they offer greater resolution and color depth, larger files take a longer time to download and process.

Command sequencing data file 7 stores commands which control the view as displayed on a user's monitor. Command sequencing data file 7 also stores commands which retrieve new image files and play multimedia (for example, video clips) and sound files. The combination of these three sets of commands enables a complete, multimedia experience. The command sequenece data file may be a file stored in the RAM or ROM of a computational device, a hard drive, a tape, a CD-ROM, hardwired into an ASIC, and equivalents thereof. Additionally, the image data file may be a file stored in the RAM or ROM of a computational-device, a hard drive, a tape, a CD-ROM, hardwired into an ASIC, and equivalents thereof.

Referring to FIG. 1, the image data file 6 and command sequencing data file 7 are then distributed to a user's personal computer 10. Preferably, computer 10 is at least an Intel 486i/66 or equivalent with 8 megabytes of RAM and running Microsoft's Windows 95. Improved response times are achieved with upgrades to the hardware. For example, using a Pentium™ class computer would improve response times. The distribution means includes distribution by CD-ROM 8 or over a communications network 9. Communications network includes at least local area networks, wide area networks, global area networks using twisted pair or ISDN lines and satellite networks. The different ways of downloading image data files 6 and command sequencing data files 7 include satellite downloading, modem downloading (including from bulletin boards and the Internet), and broadcast downloading.

Alternatively, the files may be available through client/server arrangements where all processing occurs at a server location with resulting display at the client's location. In this regard, the files 6 and 7 do not have to be loaded directly to a user's computer but rather onto a central server. In this regard, the user's computer may access the server through any of the communication networks described above.

When both image data file 6 and command sequencing data file 7 are available for use by computer 10, computer 10 performs the sequencing operations as detailed in the command sequencing data file 7 on the image as stored in the image data file 6. When the image data file contains a hemispherical image (or any image that contains distortions due to lens optics), the computer 10 implements a mathematical transform to remove the optical distortion from the distorted image. The mathematical transform is fully described in U.S. Pat. No. 5,185,667, expressly incorporated herein by reference. The use of the mathematical transform corrects the distortion and perspective as desired by the command sequencing data file 7. The resulting planar image is displayed on monitor 11 providing an experience comparable to video even though the data is provided from a static image. The user may assume control of the displayed image to more fully explore the image file 6. The user inputs a command from one of the various command input devices of mouse 12, keyboard 13, or other computer input device, to interrupt the execution of the command sequencing data file 7. Examples of a command indicating the user wants to view the image on his own may include mouse clicks, depression of the space bar, movement of the mouse or trackball or equivalents thereof. The user is now able to look in any direction in the image file, providing an interactive viewing experience. Alternatively, the output of the computer 10 may be recorded on videotape, hard disk, CD-ROM, RAM, ROM, and equivalents thereof for storage and later viewing.

Figure 2:
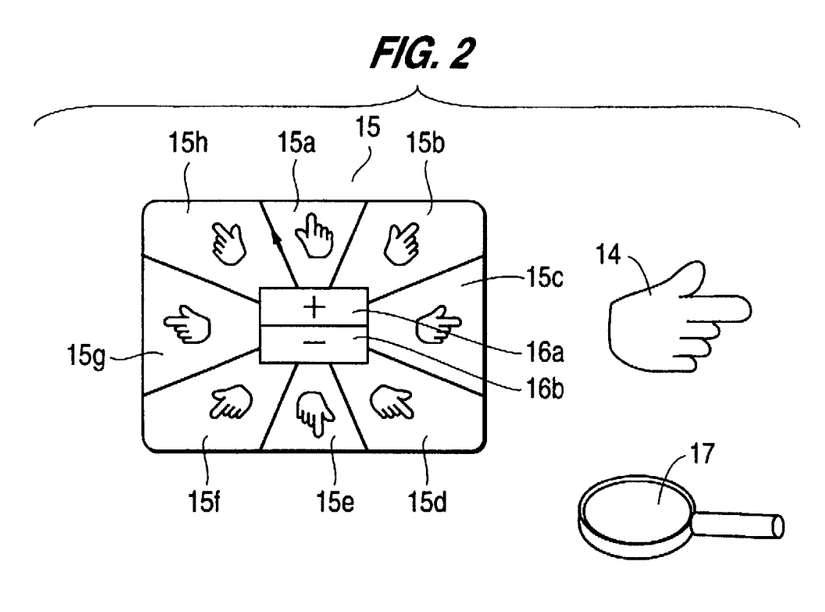
FIG. 2 shows the user interface for the user control of the viewing direction and magnification.

FIG. 2 shows a user interface 15 as experienced by the user once a user has indicated that he wants to view the image on his own. The interface 15 may be displayed over the entire viewing screen of the monitor 11 in a translucent form. Alternatively, the interface 15 may be significantly smaller and translucent or opaque. As with windowing operating environments, the interface 15 may be moved out of the way by means of standard moving techniques (including grabbing a displayed handel of the image or through a series of mouse clicks of keystrokes).

The position of cursor 14 is controlled by the viewer's movement of mouse 12 (or trackball, touch pad, or other pointing device or by keyboard entry). As cursor 14 moves around the interface 15, cursor 14 changes shape as determined by its position relative to the center of interface 15. When the cursor 14 is in or outside any of the octants 15a–15h, the cursor assumes the shape of a hand as indicated by hand 14. As the cursor moves around, the orientation of the hand icon may change so that it is always pointing away from the center of interface 15 as represented by the hands in each of octants 15a–15h. Equivalent pointing cursors may be used including arrows, triangles, bars, moving icons, and equivalents thereof. When the cursor is inside regions 16a or 16b centered in interface 15, the cursor's iconic representation changes to that of magnifying glass 17.

When the mouse's control button is depressed, the image direction shifts in the direction pointed to by the hand and at a rate of speed associated with the hand's distance from the center of the display. In the center of the display, the hand icon turns into a magnifying glass 17, allowing zoom in (when the cursor is located in the above center region 16a of interface 15) and zoom out (when the cursor is located in the below center region 16b of interface 15) allowing the user to control the magnification or scaling features of the current view. Equivalent zooming cursors may be used including arrows, triangles, bars, moving icons, and equivalents thereof. Under user control, the system provides the experience of pointing a virtual video camera in the environment stored in the image data file 6 in any desired direction.

Figure 3:
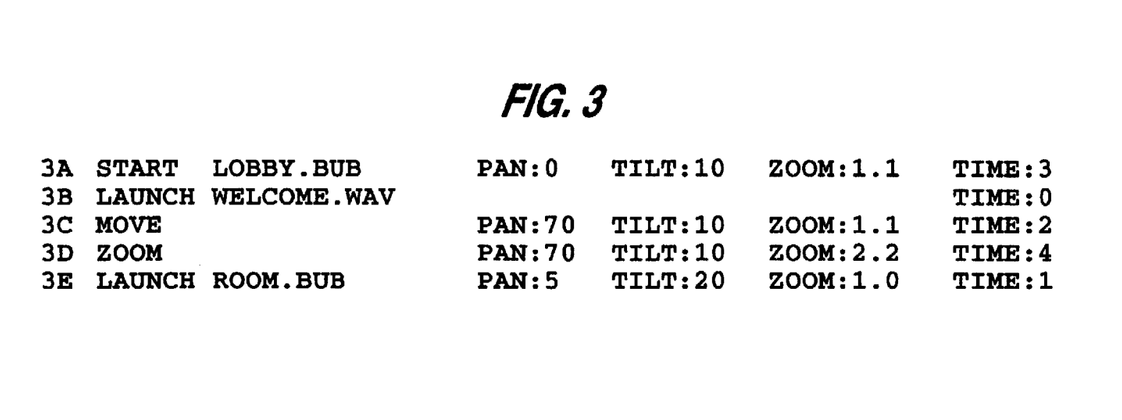
FIG. 3 shows the command file for a simple sequence.

FIG. 3 shows the command data file 7 for a simple sequence. A starting set of implemented commands includes START, MOVE, ZOOM, PAUSE, LAUNCH, and END. With these simple commands, a tour through the still image data set can be create and a compelling sequence generated. The fundamental commands and a brief description of their purpose follows:

START: Starts the sequence from a store pan, tilt, and magnification.

MOVE: Moves the image to a new location in a designated time.

ZOOM: Magnifies the image to a new zoom in a designated time.

PAUSE: Waits a specified length of time before continuing.

LAUNCH: Launches a new file, either a sound, new image or other data form (text window, video, other) to continue the sequence.

END: Ends the execution of commands in the command sequencing data file 7.

In an alternate embodiment, other command sequencing data files be launched from inside other command sequencing files. Also, a jump feature to jump from one portion to another may be launched from inside another command sequencing file. This can be implemented in an editor environment.

The command file is created by a development software tool which may be similar to the interface as described above in relation to FIG. 2 but with additional developer tools. These additional tools may include start recording function, stop recording functions, resume recording functions, launch a new file, link a new image file to a portion of the displayed images. To create a command sequence data file 7, the developer initiates a recording function, calls up a desired image data file 6, moves through the image data file and pauses or stops the recording function. The system stores the commands as input by the developer as the command sequence data file 7. If desired, the command sequence data file 7 can be edited with simple text editing tools. Command files can be developed from a series of commands that are similar in intent, but different in name from the ones listed herein.

The command sequence shown in FIG. 3 shows the commands recorded or input by a developer. When executed, these commands will produce a visual and audio tour of a screen. In this example, the file LOBBY.BUB relates to an image of a hotel lobby. The file ROOM. BUB relates to an image file of a room off of the hotel lobby. The file WELCOME.WAV relates to an audio introduction related to the LOBBY.BUB file. Here, WELCOME.WAV relates to an audio clip welcoming a user into a hotel's lobby. Executing the command sequence listed in FIG. 3, the monitor 11 will display an image of the hotel lobby which is held for three seconds as shown in step 3A. An introductory sound file titled "Welcome" is then started as shown by step 3B. A two second pan of the room from the starting point to the right proceeds for 70° degrees as shown in step 3C. A zoom doubling the image size then occurs 3D over a span of 4 seconds with a launch of another image then occurring as shown in step 3E. The fields specified after the ROOM.BUB file indicate where on the new image the displayed rectangle should be located.

Looking specifically at the data fields accompanying each command, each of the fields PAN, TILT, ZOOM, and TIME have specific ranges which relate to the information display or played. The combination of fields describe what part of an image should be displayed. The PAN field relates to how far to the left or right of dead center is the image portion to be displayed. The PAN field is measured in terms of degrees from −180° to +180° with 0° directly ahead. Directly behind the viewer is denoted as −180° or +180° with the positive degrees increasing around to the view's right. TILT relates to the degrees up and down the display should vary from the mid-line of the image. TILT extends from −90° straight down to +90° straight up. ZOOM relates to the degree of magnification desired for a given image portion. Here, the zoom field of 3A is 1.1. This means that the degree of magnification will be 1.1 times as a default magnification. Finally, the TIME field relates to how much time is allotted to go from the previous display to the current display. For example, step 3C indicates that the displayed portion should pan to 70° to the right, with a 10° positive tilt, a zoom of 1.1 over a time of 2 seconds. Alternative representations may be used including Radians, Gradients, and equivalent counting systems.

Figure 4:
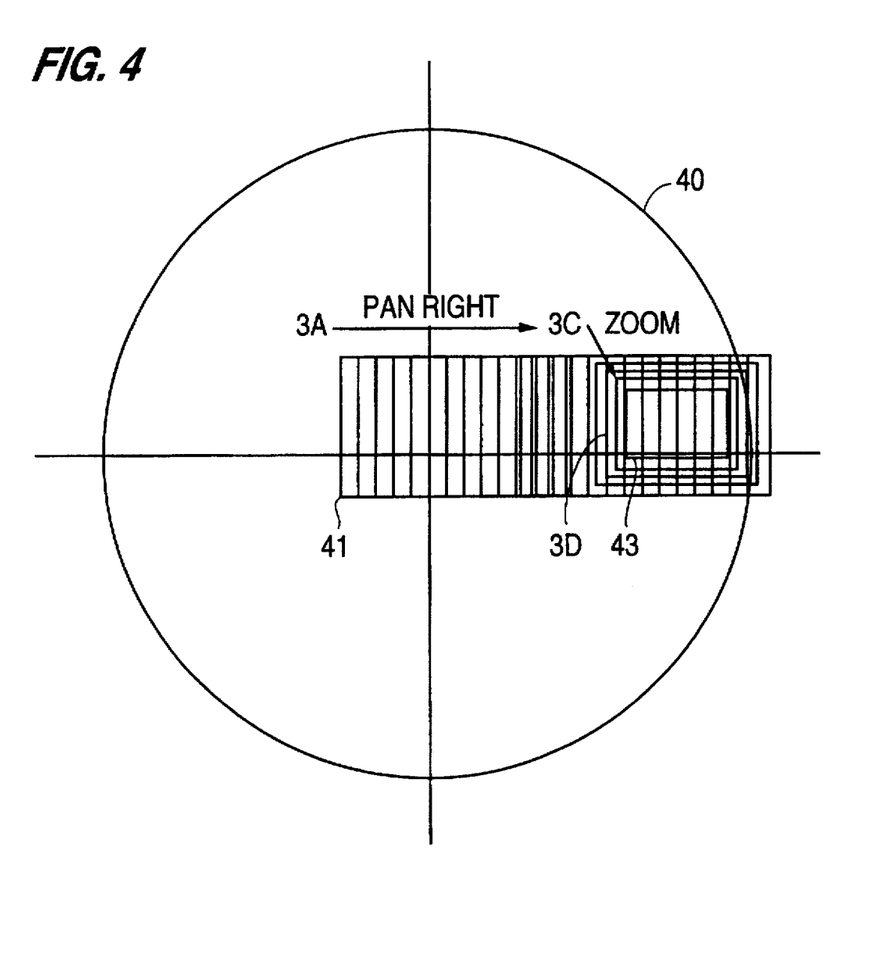
FIG. 4 shows a typical sequence as it might be viewed from the command file of FIG. 3.

FIG. 4 shows a display rectangle 41 as it moves across an image 40. Image 40 is a virtual representation of the dewarped hemispherical image as captured by a wide angle lens. The progress of the rectangle 41 across the circle 40 of FIG. 4 shows a typical sequence as it might be viewed from the command file of FIG. 3. The circle 40 represents the entire spherical image data set of the lobby with the rectangle 41 showing the presently dewarped and displayed portion of the image. As steps 3C and 3D are executed, the displayed rectangle moves from the coordinates of the image plane of rectangle 41 to the coordinates of the image plane of rectangle 42 to the coordinates of the image plane of rectangle 43. The circle 40 is a virtual image as created in the memory of computer 10. The numbers 3A through 3D refer to the views commanded by the command file.

Figure 5:
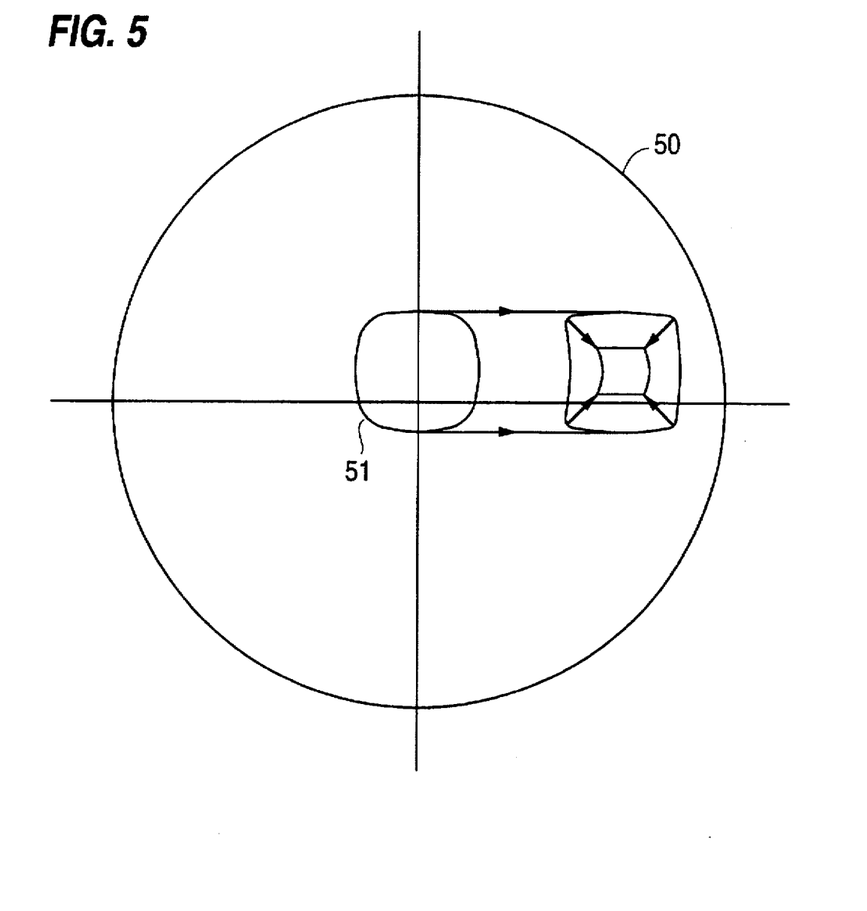
FIG. 5 shows the sequence of FIGS. 3 and 4 in a hemispherical image.

However, as dewarping an entire image as shown in FIG. 4 may tax the memory requirements of the viewer's system, only the actually viewed portion needs to be dewarped. This technique is disclosed in greater detail in U.S. Pat. No. 5,185,667. FIG. 5 represents display rectangle 51 on a hemispherical image file 50 without the dewarping technique applied. The difference is that the display rectangle 51 still shows signs of spherical distortion contained in the spherical image.

Figure 6:
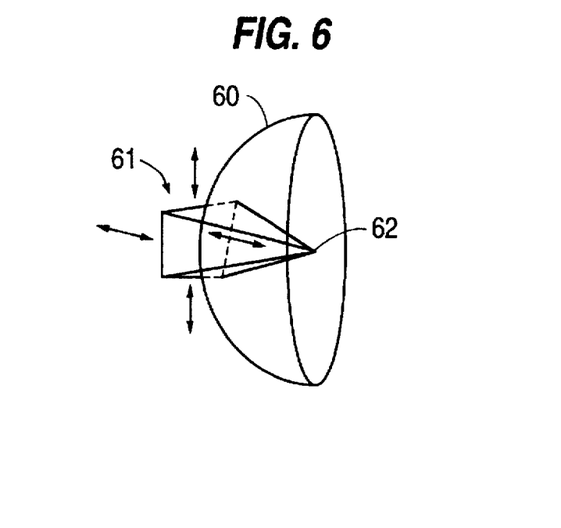
FIG. 6 shows the projection of a view rectangle on a three-dimensional image as projected from a viewer's location.

FIG. 6 shows a spherical depiction of an image 60 surrounding a viewing location 62 looking at viewing rectangle 61 as the viewing rectangle moves about under the control of the command sequence data file 7 or the viewer.

In order to provide the experience of video through small bandwidth communications channels (telephone modems), many compression techniques have been developed. Even the best of these techniques available today suffers from poor image quality, small image sizes, and the requirement of a continuous stream of data from the source to the user. The subject invention addresses these issues for a broad class of video sequences that deals with looking in different directions from a single vantage point at a static environment (an outdoor panorama, the interior of a car, the interior of a room, etc.). These environments can be viewed in a video presentation from the sequencing of angular and magnification commands that guide the presentation as if a camera had captured video data at the same location.

The resulting image sequence is of high quality because it begins as a high resolution still. The image size can be large or small without effecting the size of the data needed to construct the presentation The data can be distributed in a batch form as the sequence is created from a still data file and its duration is determined by the command sequencing, not the bandwidth or storage size available to sustain the data stream. One advantage of transmitting the multimedia files as a compressed group of files in a batch is that continuous linkage between the computer 10 and the communication network does not need to be maintained. In this regard, less system resources are used as the files do not need to be continuously downloaded. Preferably, while a viewer is viewing an image, the computer 10 is decompressing and formatting the next image file for display.

The bandwidth commonly available to distribute digital information is presently constrained by twisted pair system to approximately 28.8 kbs and will grow with future methods using fiber optics, satellite transmission, cable modems, etc. and related transmission systems. The subject invention provides a means and apparatus to address the distribution of compelling video experiences for certain applications via networks presently available.

From the foregoing description, it is or should be readily apparent that the described method of operation and apparatus permits a user to obtain a total immersive guided and unguided experience and that the disclosed system achieves the objectives sought. Of course, the foregoing description is that of preferred embodiments of the invention and various changes and modifications may be made without departing from the spirit and scope of the invention as defined by the appended claims. All of the above-referenced U. S. patents and patent applications referenced herein should be deemed to be incorporated by reference as to any subject matter believed to be essential to an understanding of the present invention.

We claim:

1. A device for sequencing images from a single still image data file providing the perception of video from batch data files which comprises:

a camera image capture system for receiving optical images and for producing output corresponding to said optical images;

a lens attached to said camera imaging system for producing hemispherical optical images, for optical conveyance to said camera imaging system;

a positioning device that registers both hemispheres so as to create a set of two hemispheres thereby creating a spherical image of a remote environment;

an image scanning means for receiving said output from said camera imaging system and for digitizing said output signals from said camera imaging system;

a command data file means that sequences said images so as to deliver an apparently video experience;

a data transmission means for sending said image and said command data files to personal computers worldwide;

a personal computer means for executing image transform processes for processing said data in a sequence controlled by said command sequencing data or by user input moving input image according to selected viewing angles and magnification, and for producing sequenced output images;

output display means for user viewing of image sequence;

input means for selecting said viewing angles and magnification with either mouse, keyboard, or other means that controls a hand for navigating the image or a magnifying glass for zooming on the image.

2. The device of claim 1 wherein the environments in the image can be distributed via digital networks in a batch operation similar to still images, but can be viewed in a continuous mode similar to video.

3. The device of claim 1 wherein the user can take control of the image and control the direction of view in any direction.

4. The device of claim 1 wherein links to audio, flat images, text, graphics, video clips and other spherical photographs can be accomplished.

5. The device of claim 1 wherein the techniques applied to still images can be applied to video data files as the bandwidth available for distribution increases.

6. The device of claim 1 wherein said input means further provides for input of a selected portion and magnification of said view to said transform processor means by way of a simple pointing user interface where motion direction is controlled by the direction the hand points in and velocity is controlled by the distance from the center of the display.

7. The device of claim 1 wherein the transform is performed at rates at or approaching video rates resulting in a sequenced image presentation that provides the user with the perception of video without a continuous update of the input data.

* * * * *

UNITED STATES PATENT AND TRADEMARK OFFICE
CERTIFICATE OF CORRECTION

PATENT NO.   : 5,764,276
DATED        : June 9, 1998
INVENTOR(S)  : Martin et al.

Page 1 of 1

It is certified that error appears in the above-identified patent and that said Letters Patent is hereby corrected as shown below:

On the Title Page, item [63]:

In "Related U.S. Application Data",

Line 1, please insert -- Provisional Application Ser. No. 60/012,033, filed Feb. 21, 1996--;
Line 5, change "Nov. 14, 1994" to --Nov. 11, 1994;
Line 7, change "5,384,558" to --5,384,588--;
Line 10, change "Jan.7, 1995" to --Jan. 17, 1995--; and
Line 11, change "5,384,388" to --5,384,588--.

In "U.S. Patent Documents", please change "4,807,158 2/1989" to --4,807,158 1/1989--.

In "Other Publications", line 3, please change "technolofy" to --Technology--.

In "Abstract",
Line 2, after "viewer" insert with--;
Line 3, after "of" insert --a--;
Line 3, after "with" insert --a--; and
Line 9, change "allows" to --allow--.

Signed and Sealed this

Third Day of July, 2001

*Attest:*

*Attesting Officer*

NICHOLAS P. GODICI
*Acting Director of the United States Patent and Trademark Office*